United States Patent [19]

Griffin

[11] Patent Number: 5,351,587
[45] Date of Patent: Oct. 4, 1994

[54] CUTTING TOOL FOR MACHINING A PLUMBING NIPPLE

[76] Inventor: Rodney Griffin, 4 Clarence St., Ivanhoe, Victoria, Australia 3079

[21] Appl. No.: 952,844
[22] PCT Filed: May 21, 1991
[86] PCT No.: PCT/AU91/00222
§ 371 Date: Nov. 23, 1992
§ 102(e) Date: Nov. 23, 1992
[87] PCT Pub. No.: WO91/17852
PCT Pub. Date: Nov. 28, 1991

[30] Foreign Application Priority Data

May 21, 1990 [AU] Australia ................. 0202;90

[51] Int. Cl.$^5$ .............. B23B 5/6; B23B 3/22; B23D 21/10
[52] U.S. Cl. ..................... 82/113; 408/231; 30/97
[58] Field of Search ........ 82/113, 157; 30/96, 30/97; 408/231, 233

[56] References Cited

U.S. PATENT DOCUMENTS

| | | | |
|---|---|---|---|
| 492,579 | 2/1993 | French | 30/97 |
| 3,661,472 | 5/1972 | Beauloye | 408/231 |
| 3,817,649 | 6/1974 | Medney | 408/211 |
| 3,875,831 | 4/1975 | Beauloye | 82/4 C |
| 3,875,832 | 4/1975 | Mayfield | 82/113 |
| 3,982,451 | 9/1976 | Gilmore | 82/113 |
| 4,114,484 | 7/1978 | Feamster | 82/113 |
| 4,347,664 | 9/1982 | Petrillo | 30/97 |
| 4,615,243 | 10/1986 | Davis | 82/113 |
| 4,879,929 | 11/1989 | Roth | 82/110 |
| 5,054,342 | 10/1991 | Swiatowy et al. | 82/113 |

FOREIGN PATENT DOCUMENTS

| | | |
|---|---|---|
| 233654 | 5/1960 | Australia. |
| 452893 | 3/1974 | Australia. |
| 1550102 | 12/1968 | France. |
| 5662703 | 5/1981 | Japan. |
| 0076302 | 6/1981 | Japan ......... 82/113 |
| 2016320 | 9/1979 | United Kingdom. |

*Primary Examiner*—William E. Terrell
*Attorney, Agent, or Firm*—Edwin D. Schindler

[57] ABSTRACT

A cutting tool is disclosed which includes a substantially cylindrical body of a diameter sufficient for receiving a plumbing nipple through a first end of the body. A clamping element is provided adjacent to the first end of the cylindrical body for clamping the body to the plumbing nipple. The claimed cutting tool further includes at least one cutter, and preferably two cutters, located within the cylindrical body and mounted on a shaft which extends beyond a second end of the cylindrical body; the second end being opposite the first end. The cutting tool is adapted for rotation by the shaft which, in turn, can be attached to a power drill, or the like, so that the nipple can be cut from its outwardly directed end inwardly. The cutting tool does not itself rotate but, instead, contains a cutting head attached to a shaft which can be rotated by various rotation devices, such as an electric power drill.

11 Claims, 1 Drawing Sheet

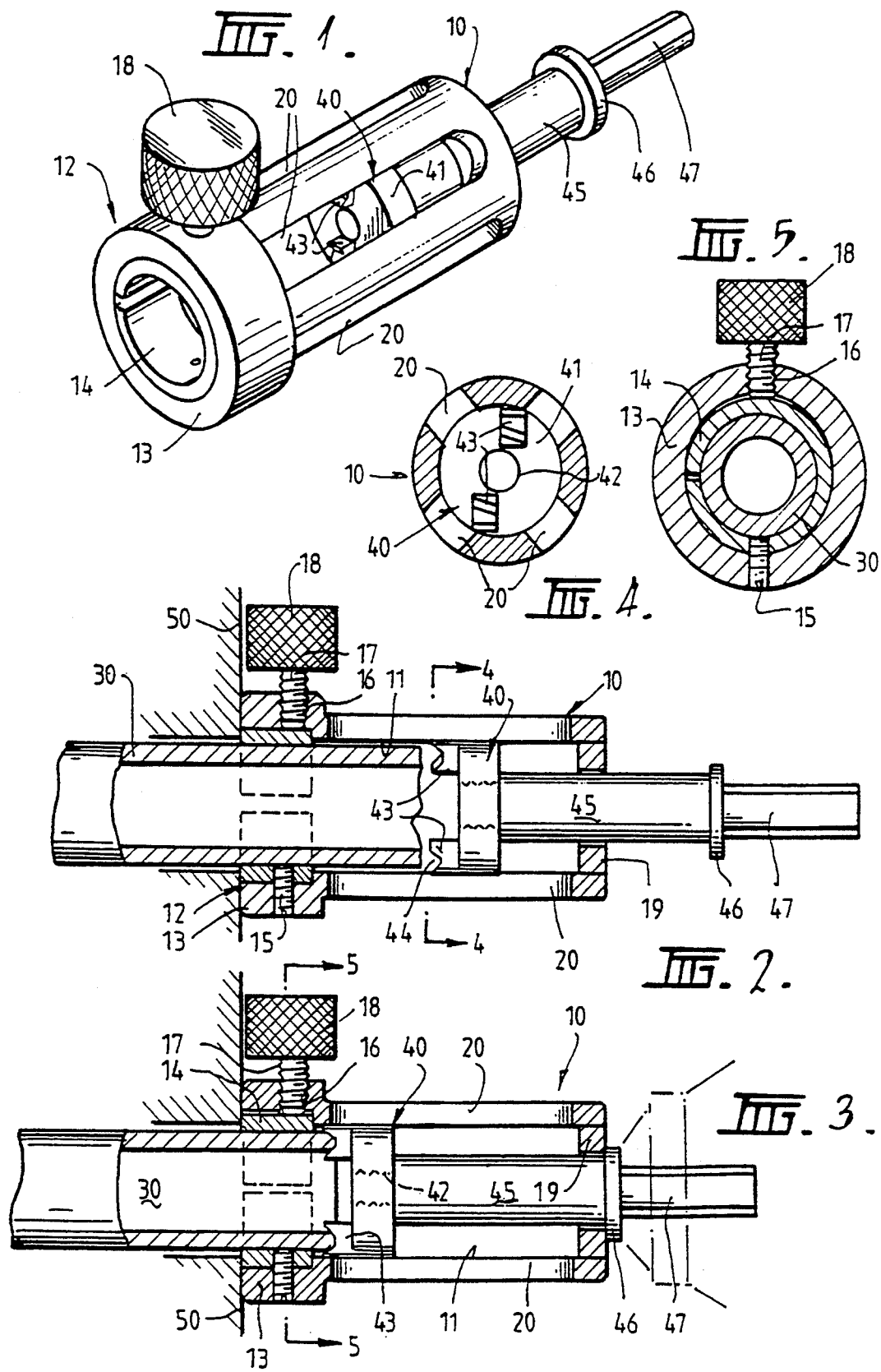

CUTTING TOOL FOR MACHINING A PLUMBING NIPPLE

P.C.T. INTERNATIONAL APPLICATION

PCT/AU91/00222. As Amended on Jun. 20, 1991 and Apr. 14, 1992.

This invention relates to a cutting tool and, in particular, to a tool adapted to cut plumbing nipples.

Nipples, which are normally lengths of threaded brass pipe are used in a number of applications in plumbing but the most usual of these is for the connection of shower roses and bath filling nozzles and also for the connection of pipes for taps in wash basins, sinks, troughs and the like.

Normally the piping is located by the plumber before tiling is effected and a nipple is left extending outwardly into the area where the connection is to be made, and capped. The tiler locates the tiles around the nipple, cutting the tiles where necessary and after tiling is completed the fitting required is connected to the nipple.

Because the plumber is not necessarily sure as to the depth of the tiles, and their exact location, nipples are invariably left longer than the required length and, in most cases, need to be cut before the fitting is connected thereto.

Conventionally this cutting has been by the use of a hack saw and it will be appreciated that the hack saw normally has to be operated parallel to the surface through which the nipple extends, and relatively close to the surface, and this does mean that cutting the nipples to length is a somewhat tedious job, and it can mean that the tiles or the like can be damaged, at a cost to the plumber.

I have already proposed, in my copending Australian Patent Application, 63193/90 filed Sep. 25, 1989 and entitled "Cutting Tool" a particular form of tool adapted to cut plumbing nipples and this tool has proved very satisfactory in practice.

There are however some situations where my previously designed tool is not fully satisfactory, and that is where the space around the nipple is extremely restricted and, further, the said previous tool may be too expensive for occasional users, such as home handymen.

It is the object of the present invention to provide a cutting tool whereby nipples can readily be cut in situ rapidly and readily and without the likelihood of damage to the surround.

In accordance with the invention I provide a cutting tool having a substantially cylindrical body of a diameter to receive a plumbing nipple through one end thereof, means adjacent that end to clamp the body to the nipple, a cutting tool having at least two cutters located within the body and mounted on a shaft which extends beyond the other end of the body, which cutting tool is adapted for rotation by the shaft which, in turn, can be attached to a power drill or the like so that the nipple can be cut from its outwardly directed end inwardly.

In order that the invention may be more readily understood I shall describe one specific embodiment of the invention in relation to the accompanying drawings in which:

FIG. 1 is a front perspective view of the tool;

FIG. 2 is a sectional side view of the tool showing the location of the tool relative to a surface with the nipple extending further than is required;

FIG. 3 is a view similar to FIG. 2 with the nipple cut;

FIG. 4 is a view along line 44 of FIG. 3 looking at the cutters; and

FIG. 5 is a view along line 55 of FIG. 3 showing the clamping arrangement.

The body 10 is basically cylindrical in form and may be made of any required material but I prefer that it be made of machinable tool steel.

The internal diameter of the bore 11 of the body is designed to be closely received about the nipple 30 to be cut and in one practical size this will be approximately twenty-two millimeters (22 mm).

The total length of the body will depend upon the depth of cut required but in practice I believe a total length of approximately seventy millimeters (70 mm) would be satisfactory for use with a body of this diameter.

Adjacent the end 12 of the body which is adapted to pass over the nipple 30 I provide an enlarged portion 13 which has a split sleeve 14 located therein.

The sleeve 14 can be held in position by a grub screw or the like 15 which can pass through the enlarged portion 13 into the sleeve 14.

Diametrically opposite the grub screw there is a tapped aperture 16 which is adapted to receive a threaded member 17 which has a head 18 to enable the split member to be compressed.

The arrangement is such that when the nipple 30 is located within the sleeve 14 and the threaded member 17 is tightened the sleeve 14 clamps about the nipple and retains the tool in position on the nipple but without damage to the thread of the nipple.

The material of the sleeve may preferably be brass or the like so that it is not substantially harder than the nipple to minimise damage.

The other end of the body can be partially closed by a plug 19 which may be of material similar to that of the body or could be of, say, phosphor bronze and which has an axial bore therethrough.

The body 10, between the position of the radial bore and the plug can be relieved as by having four cut out slots 20 equally spaced around the body.

The cutter 40 can be formed in a manner somewhat similar to a tap seat cutter or can in fact be a tap seat cutter.

The body 41 of the cutter is cylindrical in form, is provided with a bore 42 therethrough, and in this application the bore can be threaded, and has on its outer face a pair of teeth 43.

The particular construction and formation of these teeth 43 can vary.

As illustrated the teeth 43 are offset from the diameter and their outer faces can be formed to provide a chamfer on the end of the nipple as the nipple is cut. Such an arrangement has advantages in that the pressure applied to cut the face can be less than would be the case if a square cut was being effected.

Passing through the bore in the plug in the body is a shaft 45 which at its free end is threaded to cooperate with the thread in the bore 42 of the cutter so the cutter may be firmly connected to the shaft.

The shaft is preferably provided with a collar 46 or the like externally of the closed end 19 of the body which collar acts as a stop for movement of the cutter towards the open end of the body.

The portion 47 of the shaft extending rearwardly from the collar may be cylindrical or could be formed to be hexagonal as this is adapted to be held in a chuck of a drill.

In use the shaft portion 47 is connected to a drill, which can well be either battery or power operated and the open end 12 of the body is placed over the extending portion of the nipple 30.

The arrangement of this portion of the body can be such as to effectively control the final length of the nipple, as will be described hereinafter, by locating the free end of the body adjacent the tiling or surface 50 through which the nipple passes.

When located the threaded member 17 is tightened by the knurled member 18 compressing the sleeve 14 so that the body is firmly connected to the nipple. The drill is operated and the cutter 40 is brought into contact with the free end of the nipple.

The swarf formed is passed from the body through the slots 20 therein and on forward pressure so the end of the nipple is removed.

This operation continues until the collar 46 on the shaft contacts the plug in the body at which time the cutting operation is completed.

By simply loosening the threaded member 17 the assembly can be removed from the nipple.

If the nipple initially extends a substantial distance from the tile or other surface the operation can be repeated until the open end 12 of the body terminates at the required position.

It will be seen that the device of the invention has great advantages. Firstly, where space is restricted, there is no extension other than the knurled member 18 beyond the diameter of the body until the chuck of the drill and, depending upon the type of the drill, so the chuck may be no larger in diameter than the body.

In this case the first extension is the actual drill body and, again, depending upon the form of drill, this, on one side at least, may extend little or no distance beyond the chuck.

The device can then be used in very confined spaces.

The cutting is very clean and the outwardly directed surface is chamfered and it is found that taps or other connectors can be connected to the nipple without any reworking of the thread on the nipple.

The device of the invention is extremely simple but it will be appreciated that it is practical it carries out its requirements rapidly and it removes any likelihood to any adjacent tiles or wall surface.

The claims defining the invention are as follows:

1. A cutting tool for machining a pipe nipple, comprising:
    a substantially cylindrical body of an internal diameter sufficient for receiving said pipe nipple through a first end of said cylindrical body;
    clamping means adjacent said first end for clamping said cylindrical body to said pipe nipple, said clamping means being a compressible band extending about the inner circumference of said cylindrical body to encircle the pipe nipple, said compressible band being acted upon by a member on said cutting tool for effecting selective compression of said compressible band and causing said compressible band to closely abut said pipe nipple;
    a shaft extending beyond a second end of said cylindrical body, said second end being opposite said first end;
    means for effecting rotation of said shaft;
    a cutting head attached to said shaft; and,
    at least one cutter located within said cylindrical body and mounted on said cutting head, said cutting head being adapted for rotation by said shaft which, in turn, is attachable to said means for effecting rotation of said shaft so that said pipe nipple is able to be cut from its outwardly directed end inwardly.

2. The cutting tool as claimed in claim 1, wherein said cutting head has a diameter substantially equal to the internal diameter of said cylindrical body with said at least one cutter extending outwardly therefrom, said at least one cutter being shaped for providing a required profile at an outer end of said pipe nipple.

3. The cutting tool as claimed in claim 2, wherein said cutting tool has two cutters.

4. The cutting tool as claimed in claim 1, further comprising a closure and a bearing formed in said closure at said first end of said cylindrical body through which said shaft passes.

5. The cutting tool as claimed in claim 4, wherein said shaft includes an extension thereon capable of acting against said closure for restricting inward movement of said shaft.

6. The cutting tool as claimed in claim 1, wherein said cylindrical body includes relieved portions for permitting swarf to pass therefrom.

7. A cutting tool for machining a pipe nipple, comprising:
    a substantially cylindrical body of an internal diameter sufficient for receiving said pipe nipple through a first end of said cylindrical body;
    clamping means adjacent said first end for clamping said cylindrical body to said pipe nipple;
    a shaft extending beyond a second end of said cylindrical body, said second end being opposite said first end;
    means for effecting rotation of said shaft;
    a cutting heat attached to said shaft;
    at least one cutter located within said cylindrical body and mounted on said cutting head, said cutting head being adapted for rotation by said shaft which, in turn, is attachable to said means for effecting rotation of said shaft so that said pipe nipple is able to be cut from its outwardly directed end inwardly;
    a closure; and,
    a bearing formed in said closure at said first end of said cylindrical body through which said shaft passes, said shaft having an extension thereon capable of acting against said closure for restricting inward movement of said shaft.

8. The cutting tool as claimed in claim 7, wherein said clamping means is a compressible band, said cutting tool further comprising a member for acting on said compressible band, said member effecting selective compression of said compressible band to closely abut said pipe nipple.

9. The cutting tool as claimed in claim 7, wherein said cutting head has a diameter substantially equal to the internal diameter of said cylindrical body with said at least one cutter extending outwardly therefrom, said at least one cutter being shaped for providing a required profile at an outer end of said pipe nipple.

10. The cutting tool as claimed in claim 7, wherein said cutting tool has two cutters.

11. The cutting tool as claimed in claim 7, wherein said cylindrical body includes relieved portions for permitting swarf to pass therefrom.

* * * * *